United States Patent [19]

Wzietek

[11] Patent Number: 5,528,891
[45] Date of Patent: Jun. 25, 1996

[54] TRACTION CONTROL DEVICE FOR A LAWN MOWER

[76] Inventor: Zbigniew A. Wzietek, 26 Bohac St.; apt. 1, Swoyersville, Pa. 18704-2247

[21] Appl. No.: 402,112

[22] Filed: Mar. 10, 1995

[51] Int. Cl.⁶ .................................................. A01D 34/86
[52] U.S. Cl. ........................ 56/16.7; 56/DIG. 10; 301/47
[58] Field of Search ..................... 56/16.7, 17.2, 56/1, DIG. 3, DIG. 9, DIG. 10; 301/44.1, 44.4, 46, 47, 48

[56] References Cited

U.S. PATENT DOCUMENTS

| | | |
|---|---|---|
| 3,112,138 | 11/1963 | Kaner ......................................... 301/47 |
| 4,589,252 | 5/1986 | Williams ................................. 56/16.7 X |
| 4,735,038 | 4/1988 | Williams ................................. 56/16.7 X |
| 5,029,945 | 7/1991 | Kidwell et al. ......................... 301/48 X |

*Primary Examiner*—Terry Lee Melius
*Attorney, Agent, or Firm*—Michael I. Kroll

[57] ABSTRACT

A traction control device for a lawn mower comprising a pair of lawn gripping assemblies. A facility is for mounting each lawn gripping assembly onto a side of each rear wheel of the lawn mower, so as to prevent the lawn mower from sliding down a steep sloped grade, when cutting grass across it on a lawn.

12 Claims, 2 Drawing Sheets

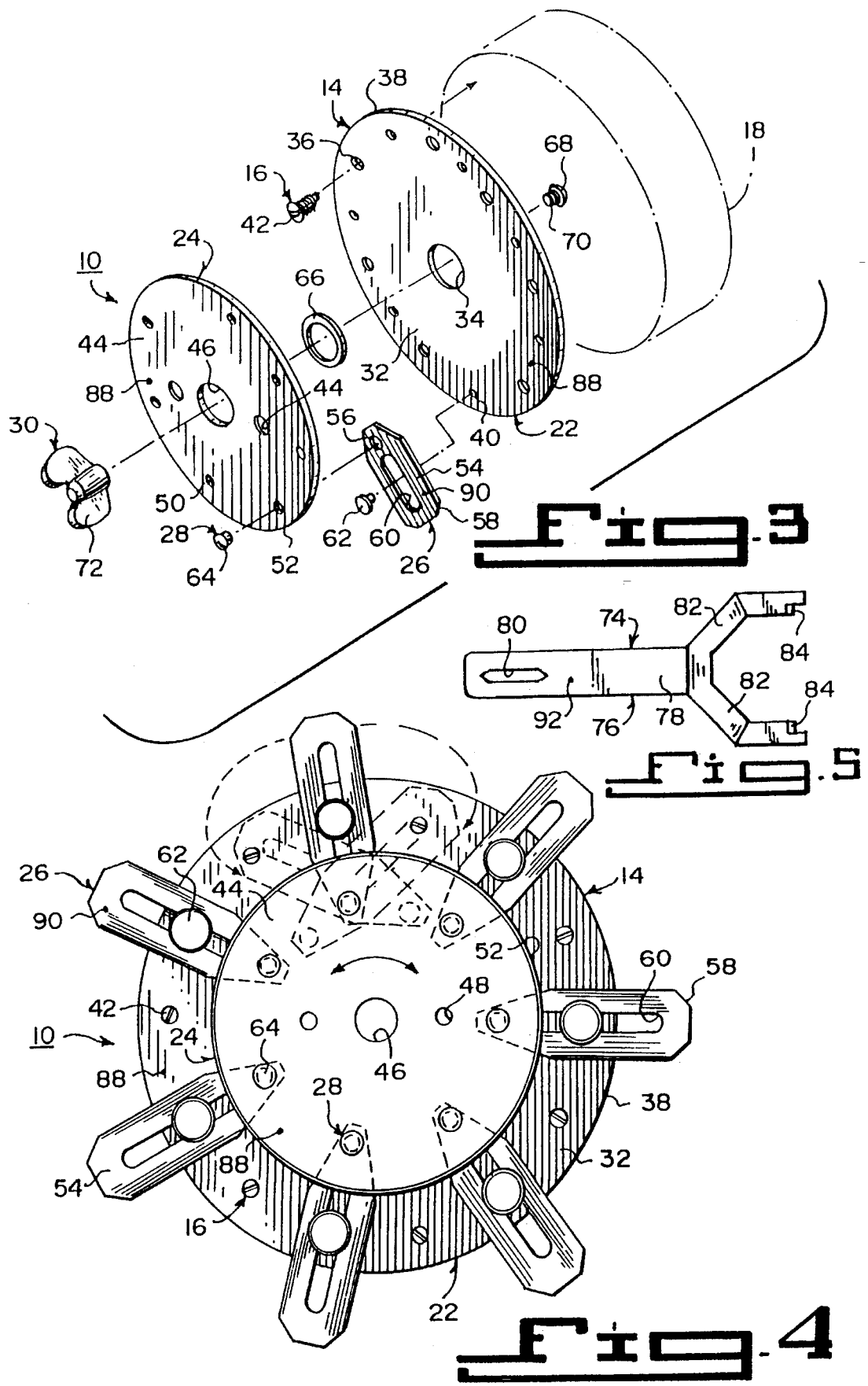

TRACTION CONTROL DEVICE FOR A LAWN MOWER

BACKGROUND OF THE INVENTION

1. Field of the Invention

The instant invention relates generally to gardening equipment and more specifically it relates to a traction control device for a lawn mower.

2. Description of the Prior Art

Numerous gardening equipment have been provided in prior art that are adapted to include lawn mowers, which are used to cut grass on lawns.

Due to the contour of the land, some people are faced with the task of cutting the grass with the lawn mowers on steep slopes. One way to accomplish this is to let the lawn mower down a hill on a rope then pull it back up. Another way is to walk up and down a slope, struggling with the lawn mower. If you ever tried to cut grass across the slope, you will find that the lawn mower tends to slide down the hill which makes it next to impossible to wrestle with. While these units may be suitable for the particular purpose to which they address, they would not be as suitable for the purposes of the present invention as heretofore described.

SUMMARY OF THE INVENTION

The instant invention being a traction control device will reduce fatigue and frustration associated with mowing on rough terrain. A pair of lawn gripping assemblies can be connected directly on the rear wheels of most standard push mowers by a plurality of screws through mounting holes in a base plate. The assemblies are mounted to the rear wheels only to allow the user full steering ability. Each assembly consists of three basic parts being a base plate, a plurality of equally spaced fingers and a rotary plate, which allow the user to retract the fingers when mowing on a flat surface. This design is tailored for seven inch wheels, but can be made to accommodate other sizes by proportional dimension changes. The fingers are extended or retracted through the use of the spanner wrench.

A primary object of the present invention is to provide a traction control device for a lawn mower that will overcome the shortcomings of the prior art devices.

Another object is to provide a traction control device for a lawn mower, in which the device being a pair of lawn gripping assemblies, mounted to the rear wheels of the lawn mower, will prevent the lawn mower from sliding down a steep slope on a lawn.

An additional object is to provide a traction control device for a lawn mower, in which fingers in each lawn gripping assembly can be extended outwardly and retracted inwardly by the use of a spanner wrench, so that when the fingers are retracted inwardly the lawn mower can be used to cut grass on a flat surface and when the fingers are extended outwardly the lawn mower can be used to cut grass on the steep slope.

A further object is to provide a traction control device for a lawn mower that is simple and easy to use.

A still further object is to provide a traction control device for a lawn mower that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 3 is a further enlarged exploded perspective view showing the various parts of the instant invention.

FIG. 4 is a side view taken in the direction of arrow 4 in FIG. 2.

FIG. 5 is a bottom view of a spanner wrench used to extend and retract the fingers.

Similar reference characters denote corresponding features consistently throughout the attached drawings.

DETAILED DESCRIPTION OF THE PREFERRED EMBODIMENTS

Figure 1:
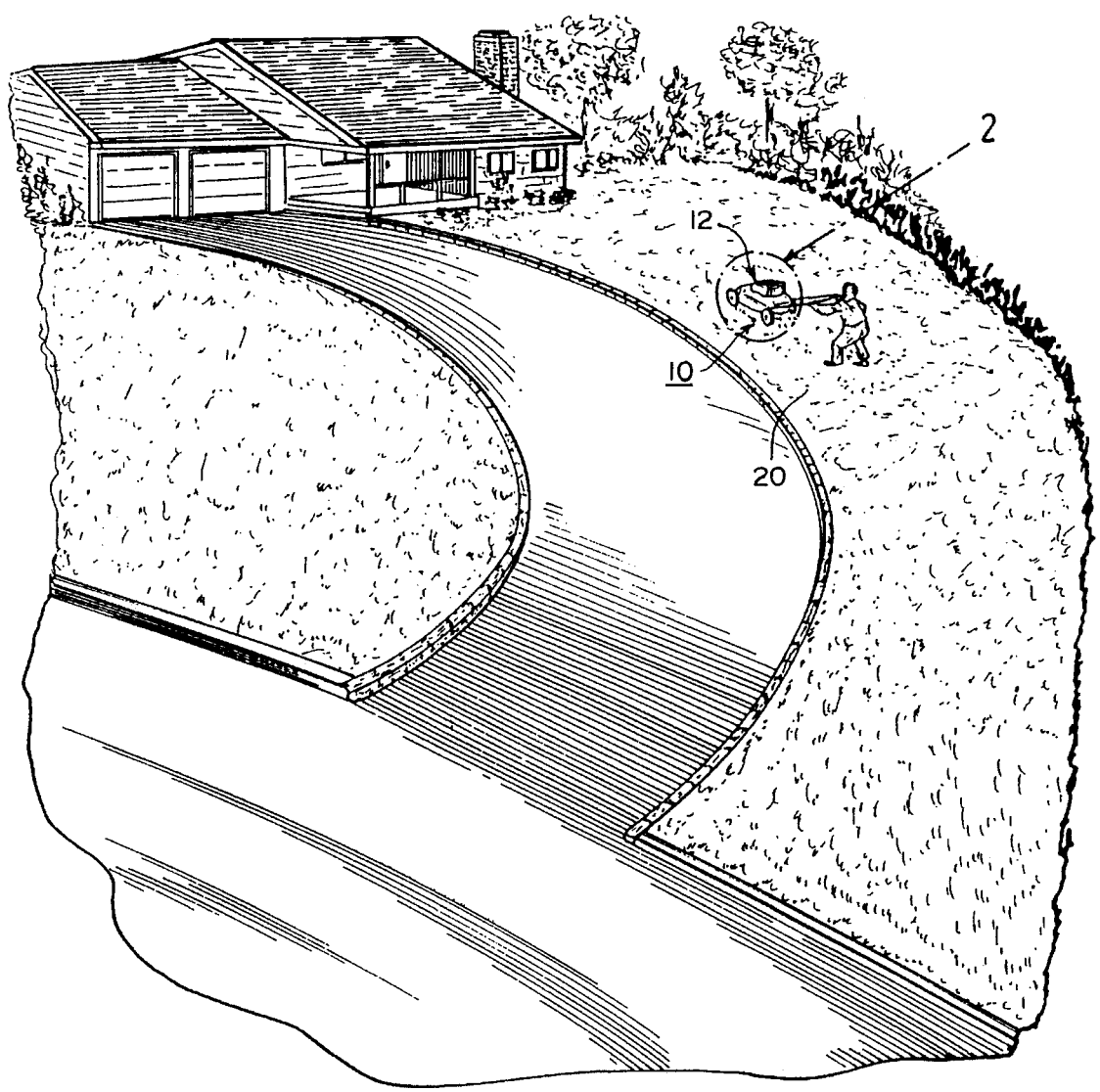
FIG. 1 is a perspective view showing a person using a lawn mower with the instant invention cutting grass on a steep slope of a lawn.
Figure 2:
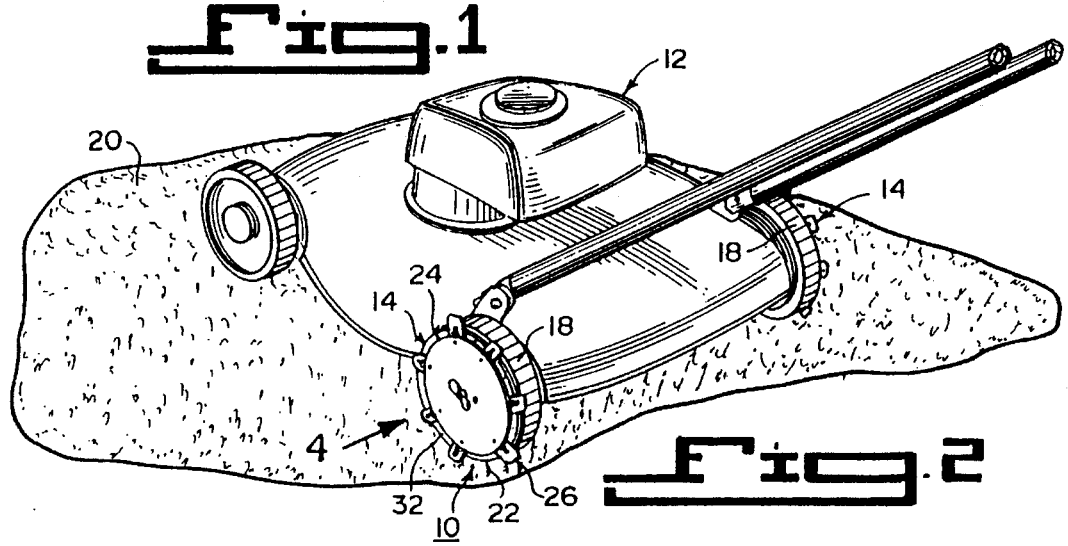
FIG. 2 is an enlarged perspective view as indicated by arrow 2 in FIG. 1, of the lawn mower with the instant invention mounted on the rear wheels thereof.

Turning now descriptively to the drawings, in which similar reference characters denote similar elements throughout the several views, FIGS. 1 through 4 illustrate a traction control device 10 for a lawn mower 12, comprising a pair of lawn gripping assemblies 14. A facility 16 is for mounting each lawn gripping assembly 14 onto a side of each rear wheel 18 of the lawn mower 12, so as to prevent the lawn mower 12 from sliding down a steep sloped grade, when cutting grass across it on a lawn 20.

Each lawn gripping assembly 14 includes a base plate 22, a rotary plate 24 and a plurality of fingers 26. A structure 28 is for attaching each finger 26 radially between the base plate 22 and the rotary plate 24. A unit 30 is for adjusting and locking the rotary plate 24 to the base plate 22. In a first instance, the fingers 26 can be extended outwardly to dig into the ground to allow the lawn mower 12 to be used on the steep sloped grade. In a second instance, the fingers 26 can be retracted inwardly to allow the lawn mower 12 to be used on a flat surface.

The base plate 22 is a first disk shaped member 32, having a central aperture 34. A plurality of holes 36 are radially spaced apart about the circumference 38 of the first disk shaped member 32. A plurality of openings 40 are radially spaced apart between the plurality of holes about the circumference 38 of the first disk shaped member 32.

The mounting facility 16 is a plurality of screws 42. Each screw 42 is inserted through one hole 36 in the first disk shaped member 32 and threaded into the side of the respective rear wheel 18 of the lawn mower 12.

The rotary plate 24 is a second disk shaped member 44, smaller in diameter than the first disk shaped member 32. The second disk shaped member 44 has a central aperture 46 and two orifices 48. Each orifice 48 is on an opposite side of the central aperture 46. A plurality of holes 50 are radially spaced apart about the circumference 52 of the second disk shaped member 44. Each finger 26 is a flat thin piece 54, having an orifice 56 at an inner end, beveled corners 58 on an outer end and a longitudinal slot 60 therebetween.

The attaching structure 28 consists of a first rivet 62 inserted through the longitudinal slot 60 in the flat thin piece 54 and is secured into one opening 40 in the first disk shaped member 32. A second rivet 64 is inserted through one hole 50 in the second disk shaped member 44 and is pivotally secured into the orifice 56 in the finger 26. the finger 26 can pivot about the second rivet 64, while the longitudinal slot 60 can slide on the first rivet 62.

The adjusting and locking unit 30, as best seen in FIG. 3, includes a washer 66 which fits between the first disk shaped member 32 at the first central aperture 34 and the second disk shaped member 44 at the second central aperture 46. A bolt 68 having a threaded shank 70, extends from a rear surface of the first disk shaped member 32, through the first central aperture 34 in the first disk shaped member 32, through the washer 66 and through the second central aperture 46 in the second disk shaped member 44. Washer 66 must be sued to prevent plate 24 from bending around the fingers 26. A wing nut 72 threads onto the threaded shank 70 of the bolt 68, up against the second disk shaped member 44. A tool 74, shown in FIG. 5, engages with the wing nut 72, so as to tighten and loosen the wing nut 72 upon the threaded shank 70 of the bolt 68. The tool 74 also engages with the two orifices 48 in the second disk shaped member 44, to rotate the second disk shaped member 44 when the wing nut 72 is loosened upon the threaded shank 70 of the bolt 68, so as to extend outwardly all of the fingers 26 and retract inwardly all of the fingers 26.

The tool 74 is a generally Y-shaped spanner wrench 76, that contains a handle 78 having a slot 80 therethrough, to engage with the wing nut 72. a pair of arms 82 extend from the handle 78. Each arm 82 has a right angle projection pin 84, to engage with one orifice 48 in the second disk shaped member 44.

The first disk shaped member 32 is fabricated out of galvanized steel 88. The second disk shaped member 44 is also fabricated out of galvanized steel 88. Each finger 26 is fabricated out of stainless steel 90. The spanner wrench 76 is fabricated out of carbon steel 92.

LIST OF REFERENCE NUMBERS 10 traction control device
12 lawn mower
14 lawn gripping assembly
16 mounting facility
18 rear wheel of 12
20 lawn
22 base plate
24 rotary plate
26 finger
28 attaching structure
30 adjusting and locking unit
32 first disk shaped member for 22
34 first central aperture in 32
36 hole in 32
38 circumference of 32
40 opening in 32
42 screw of 16
44 second disk shaped member for 24
46 second central aperture in 44
48 orifice in 44
50 hole in 44
52 circumference of 44
54 flat thin piece for 26
56 orifice in 54
58 beveled corner on 54
60 longitudinal slot in 54
62 first rivet of 28
64 second rivet of 28
66 washer of 30
68 bolt of 30
70 threaded shank of 68
72 wing nut of 30
74 tool
76 Y-shaped spanner wrench for 74
78 handle of 76
80 slot in 78
82 arm of 76
84 projection pin on 82
88 galvanized steel for 32, 44
90 stainless steel for 26
92 carbon steel for 76

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A traction control device for a lawn mower comprising:
  a) a pair of lawn gripping assemblies;
  b) means for mounting each said lawn gripping assembly onto a side of each rear wheel of the lawn mower, so as to prevent the lawn mower from sliding down a steep sloped grade, when cutting grass across it on a lawn; and
  c) each said lawn gripping assembly including a base plate attached to the outside of a rear wheel, a rotary plate attached to the outside of said base plate, a plurality of fingers, means for attaching each of said fingers radially between said base plate and said rotary plate, and means for adjusting and locking said rotary plate to said base plate so that each said finger is movable between a position extended outwardly to dig into the ground to allow the lawn mower to be used on the steep sloped grade and a position retracted inwardly to allow the lawn mower to be used on a flat surface.

2. A traction control device for a lawn mower as recited in claim 1, wherein said base plate is a first disk shaped member having a central aperture, a plurality of holes radially spaced apart about the circumference of said first disk shaped member and a plurality of openings radially spaced apart between said plurality of holes about the circumference of said first disk shaped member.

3. A traction control device as recited in claim 2, wherein said mounting means is a plurality of screws, in which each said screw is inserted through one said hole in said first disk shaped member and threaded into the side of the respective rear wheel of the lawn mower.

4. A traction control device for a lawn mower as recited in claim 3, wherein said rotary plate is a second disk shaped member smaller in diameter than said first disk shaped member, said second disk shaped member having a central aperture, two orifices with each said orifice on an opposite side of said central aperture and a plurality of holes radially spaced apart about the circumference of said second disk shaped member.

5. A traction control device for a lawn mower as recited in claim 4, wherein each said finger is a flat thin piece, having an orifice at an inner end, beveled corners on an outer end and a longitudinal slot therebetween.

6. A traction control device for a lawn mower as recited in claim 5, wherein said attaching means includes:

a) a first rivet inserted through said longitudinal slot in said flat thin piece and secured into one said opening in said first disk shaped member; and b) a second rivet inserted through one said holes in said second disk shaped member and pivotally secured into said orifice in said finger, so that said finger can pivot about said second rivet while said longitudinal slot can slide on said first rivet.

7. A traction control device for a lawn mower as recited in claim 6, wherein said adjusting and locking means includes:

a) a washer which fits between said first disk shaped member at said first central aperture and said second disk shaped member at said second central aperture;

b) a bolt having a threaded shank, which extends from a rear surface of said first disk shaped member through said first central aperture in said first disk shaped member, through said washer and through said second central aperture in said second disk shaped member;

c) a wing nut which threads onto said threaded shank of said bolt up against said second disk shaped member; and d) a tool that engages with said wing nut, so as to tighten and loosen said wing nut upon said threaded shank of said bolt, said tool also engages with said two orifices in said second disk shaped member to rotate said second disk shaped member when said wing nut is loosened upon said threaded shank of said bolt, so as to extend outwardly all of said fingers and retract inwardly all of said fingers.

8. A traction control device for a lawn mower as recited in claim 7, wherein said tool is a generally Y-shaped spanner wrench that includes:

a) a handle having a slot therethrough to engage with said wing nut; and b) a pair of arms extending from said handle, each said arm having a right angle projection pin to engage with one said orifice in said second disk shaped member.

9. A traction control device for a lawn mower as recited in claim 8, wherein said first disk shaped member is fabricated out of galvanized steel.

10. A traction control device for a lawn mower as recited in claim 9, wherein said second disk shaped member is fabricated out of galvanized steel.

11. A traction control device for a lawn mower as recited in claim 10, wherein each said finger is fabricated out of stainless steel.

12. A traction control device for a lawn mower as recited in claim 10, wherein said spanner wrench is fabricated out of carbon steel.

* * * * *